Figure 1:
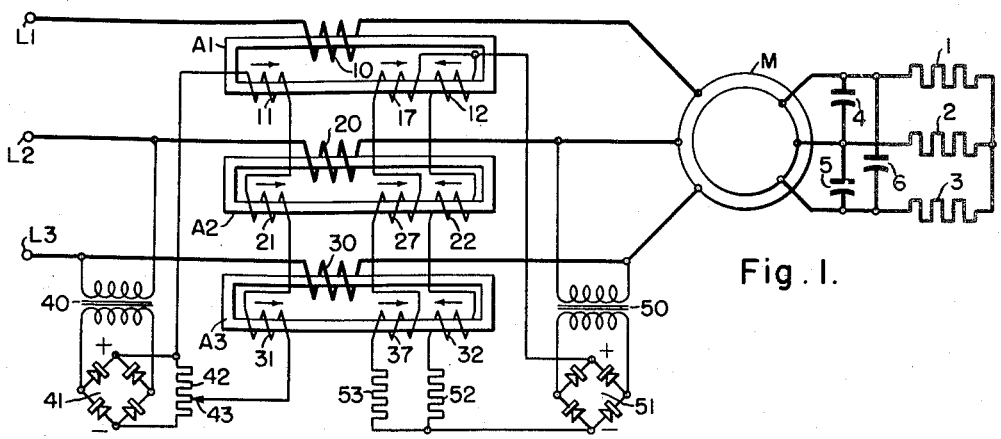

Nov. 1, 1955  E. C. RHYNE, JR  2,722,643
CONTROL SYSTEM FOR ALTERNATING-CURRENT MOTORS
Filed Oct. 6, 1951  2 Sheets-Sheet 1

WITNESSES:
E. F. Oberhein
Robert C. Baird

INVENTOR
Earl C. Rhyne, Jr.
BY
Paul E. Friedemann
ATTORNEY

Nov. 1, 1955  E. C. RHYNE, JR  2,722,643
CONTROL SYSTEM FOR ALTERNATING-CURRENT MOTORS
Filed Oct. 6, 1951  2 Sheets-Sheet 2

INVENTOR
Earl C. Rhyne, Jr.
BY
Paul E. Friedemann
ATTORNEY

United States Patent Office 2,722,643
Patented Nov. 1, 1955

2,722,643

CONTROL SYSTEM FOR ALTERNATING-CURRENT MOTORS

Earl C. Rhyne, Jr., Cheektowaga, N. Y., assignor, by mesne assignments, to Cline Electric Manufacturing Company, Chicago, Ill., a corporation of Illinois Application October 6, 1951, Serial No. 250,114

11 Claims. (Cl. 318—215)

My invention relates to systems for controlling alternating-current motors, particularly induction motors, by varying either or both the energizing voltage and current of the motor.

There are systems of this type in which all primary phase voltages of a multi-phase induction motor are subjected to a controlled change in amplitude so that the multi-phase terminal voltage of the motor remains balanced throughout the available range of voltage change. For such voltage-balanced systems, it is known or has been proposed to connect impedance devices such as for example variable resistors or saturable reactors in one, two or all current supply leads of the motor. If the effective impedance of these devices is normally constant, the control performance is not suitable for general application because the speed-torque characteristic of the motor is so modified that a relatively high-speed pull-out point exists. The appearance of a high-speed pull-out point is avoided in some known systems by varying the series impedance in dependence upon the motor speed, for instance, with the aid of a tachometer generator coupled with the motor.

It is an object of my invention to improve systems of the above-mentioned type, to secure a stable speed-torque characteristic of the motor within a wide range of control without necessity of adding a tachometer generator or the like source of speed-measuring voltage.

Another object of my invention is to improve the sensitivity and efficiency of the regulating performance of such systems so that the controlled series impedance varies more sensitively or more extensively in response to a change in motor operating conditions thus affording improved accuracy of control, or smaller or fewer components of the control circuits compared with the known systems.

Still another object of my invention is to increase the range of speed control obtainable in the above-mentioned motor control systems.

In order to achieve these objects and in accordance with one of the features of my invention, I vary the series impedance device of an induction motor control system in dependence upon two or more component control voltages of which one is constant and selectively adjustable while the other or others may vary as functions of the terminal voltage impressed on the motor, the line current through the motor, the voltage impressed across the series impedance, the voltage impressed across the rotor, or the current through the rotor.

According to another feature of the invention, I provide the rotor circuit of a terminal voltage-controlled induction motor with capacitive shunt circuits.

Figure 3:
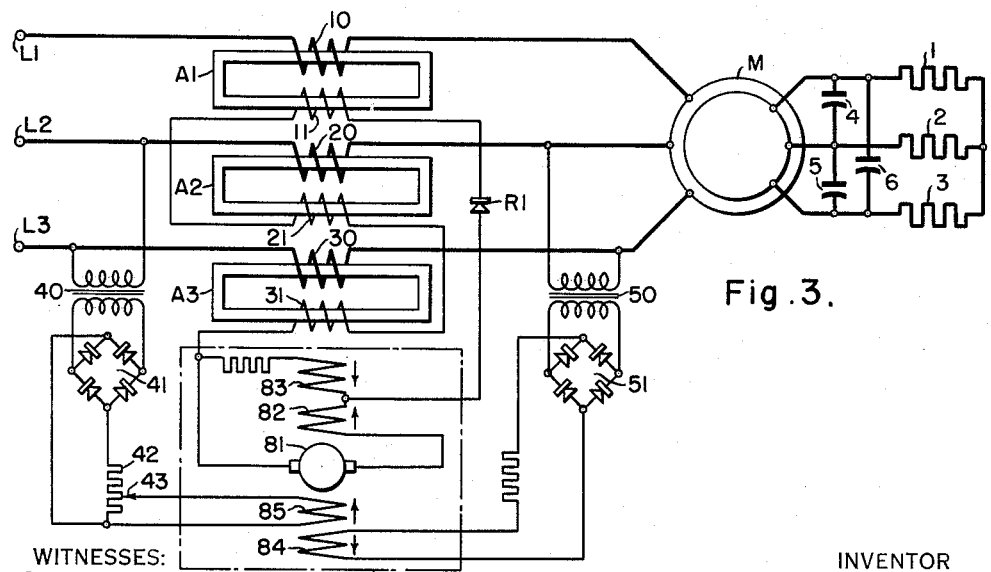
Figure 4:
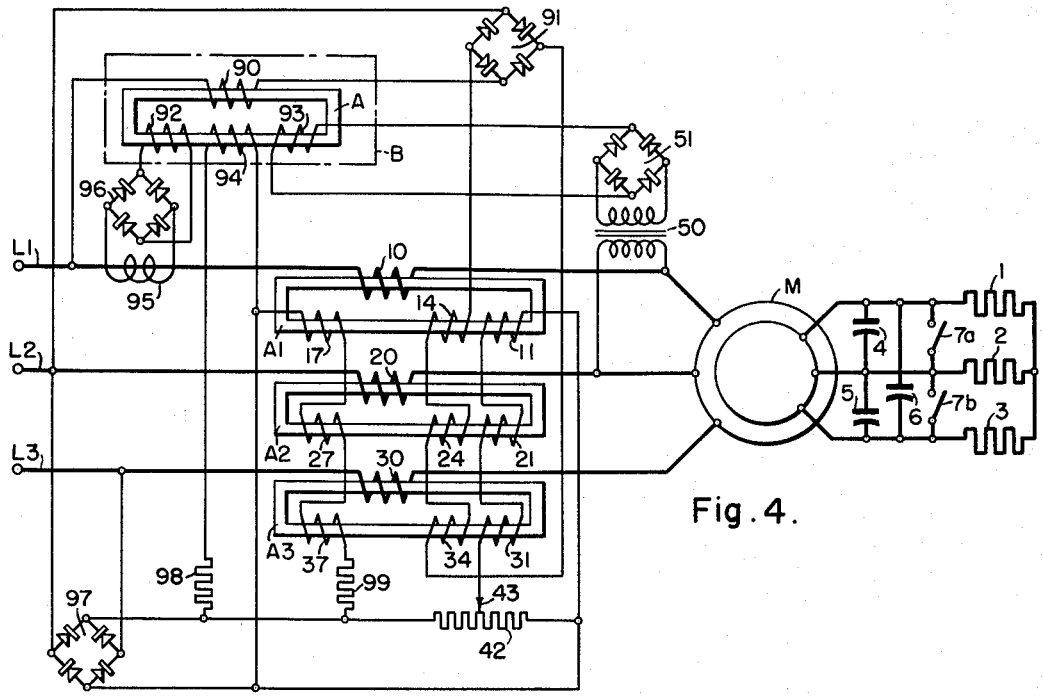
Figure 5:
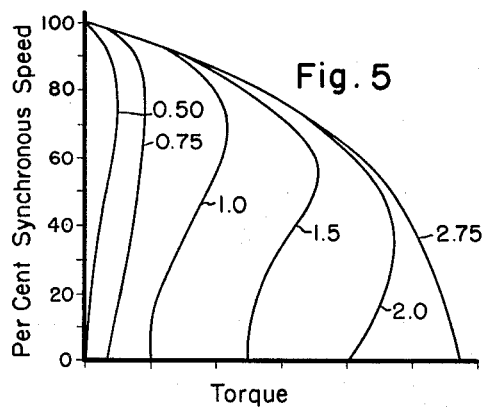
Figure 6:
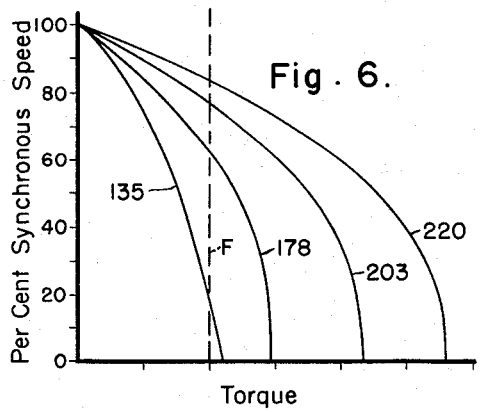
Figure 7:
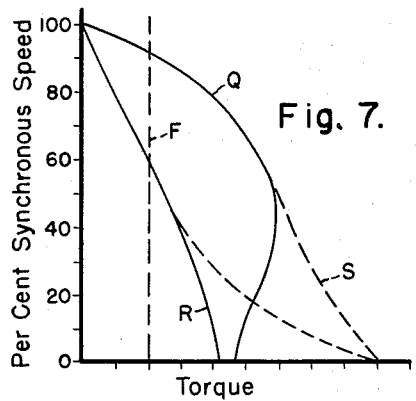

These and other features, set forth with particularity in the appended claims, as well as the above-mentioned and other objects and advantages of the invention will be apparent from a study of the following description if made in conjunction with the drawings in which Figs. 1 to 4 show schematic circuit diagram of different induction motor control systems according to the invention, while Figs. 5, 6 and 7 are coordinate speed-torque diagrams explanatory of the operation of such systems.

In all embodiments of Figs. 1 to 4, the motor to be controlled is denoted by M, the energizing line terminals are shown at L1, L2, L3, while A1, A2, A3 denote variable impedance devices between the motor and line terminals. The same reference numbers are used in these figures for indicating respective circuit components of similar design or function.

The motor to be controlled is preferably but not necessarily a wound-rotor motor and for some applications should have a relatively high impedance in its rotor circuit.

According to Fig. 1, the secondary circuit of the wound-rotor motor M has external series motor resistors 1, 2 and 3 which may be resistance-adjustable in the customary manner. Connected across the individual phases of the secondary circuit are capacitive shunt circuits, represented by capacitors 4, 5 and 6 for the purpose described hereinafter.

The primary motor terminals are connected to the line terminals L1, L2, L3 through the main windings 10, 20, 30 of saturable reactors A1, A2 and A3, respectively. The effective reactive impedance of the main winding in each reactor is differentially controlled by two direct-current saturation windings 11 and 12, 21 and 22 or 31 and 32. Each core carries further an auxiliary winding 17, 27 and 37, respectively, for reducing hunting tendencies. The windings 11, 21 and 31 (pattern windings) are excited by a constant direct current voltage of a selectively adjustable magnitude from a suitable current source. This source may conveniently be energized from the alternating-current line terminals of the system. For instance, as shown in Fig. 1, a transformer 40 connected across the line has its secondary attached to a rectifier 41 which provides rectified output voltage of constant magnitude across a potentiometric rheostat 42 whose slider or tap contact 43 is adjustable to impose a desired excitation on the series connected control windings 11, 21 and 31. The series connected windings 12, 22 and 32 are excited in dependence upon the reactor-controlled terminal voltage impressed on the motor M. To this end, a transformer 50 connected across the motor terminals energizes a rectifier 51 which applies direct current to the windings 12, 22 and 32, preferably through a calibrating resistor 52. Damping windings 17, 27 and 37 are connected in series with a calibrating resistor 53 in parallel with the circuit including windings 12, 22 and 32 across rectifier 51. These damping windings oppose the control windings 12, 22 and 32, respectively. While single-phase transformers 40 and 50 are shown, it will be understood that three-phase devices are applicable and also that the illustrated full-wave rectifiers may be replaced by three-phase rectifiers or by half-wave rectifiers with smoothing or filtering circuits if needed. The pattern control windings 11, 21 and 31 are poled in opposed relation to the control windings 12, 22 and 32, respectively, so that the resultant direct-current magnetization depends upon the difference between the adjusted constant pattern voltage and the variable voltage derived from the terminal voltage of the motor. Consequently, during the operation of the motor, the degree of saturation in each reactor is varied so as to tend to maintain the motor terminal voltage at a constant value determined by the selected setting of the control rheostat 42. The control and regulating performance thus achieved will be explained presently with reference to the schematic performance diagrams of Figs. 5, 6 and 7.

As mentioned, when an attempt is made at controlling the speed of an induction motor by series impedances in the primary motor circuit with a fixed impedance adjustment or by series saturable reactors with fixed saturation adjustments, the obtainable stable speed control range is rather limited. This will be understood from the family of speed-torque curves shown in the diagram of Fig. 5. This diagram corresponds to test results taken with a system similar to the one shown in Fig. 1, but using only the pattern windings 11, 21 and 31 with adjusting means for these windings. Capacitors 4, 5 and 6 were not used in this test. The impedance of the reactor main windings was controlled only by a selected fixed adjustment of the constant direct-current bias applied by the windings 11, 21 and 31. The curves shown in Fig. 5 are denoted by values of 0.50, 0.75, 1.0, etc., which represent the fixed amounts of direct-current bias applied to the windings 11, 21 and 31. It will be observed that except for a limited range of high bias currents, the speed-torque curves have a negative slope and hence are unsuitable for speed control.

In Fig. 6 the speed-torque curves shown in full lines are denoted by selected values of constant terminal voltage (135, 178, 203, 220). It will be seen that these characteristics have positive slopes and are suitable for speed control. For instance, if the motor thus controlled is to operate at a constant load torque denoted by line F, the speed of the motor is definitely determined by the intersection of the load torque line F with the one selected speed-torque characteristic. Consequently, in a system according to Fig. 1, which regulates the series impedance for constant motor terminal voltage, the just-mentioned conditions permit the selection of definite speed values simply by adjusting the control rheostat 42 in accordance with one of the available speed-torque characteristics.

As far as explained, the performance of the system is independent of the capacitive shunts in the secondary circuit of the motor, and indeed is sufficient for many applications. However, the provision of the capacitive shunt circuits permits further improvements, as will be explained by means of Fig. 7. The speed-torque curve Q in Fig. 7 typifies the performance of an induction motor with relatively low resistance in the rotor circuit. As mentioned, due to the negative slope of this characteristic, a given voltage does not give a definite speed for a given torque below the pull-out speed (about 40% speed in the illustrated example). Consequently, the speed cannot be sufficiently controlled by primary circuit voltage variation except over a narrow range of speeds close to synchronism.

The characteristic, as regards speed stability, can be improved by increasing the resistance in the rotor circuit, thus obtaining, for instance, the characteristic represented by curve R. Such a characteristic can be controlled by primary circuit voltage variation theoretically down to zero speed, but for a given load torque, as represented by the line F, the maximum speed obtainable becomes rather limited (to 60% of synchronous speed in the illustrated example). It will, therefore, be understood that in order to obtain a wide range of speed control, a combination utilizing both a primary voltage control and a coordinated change in secondary impedance might be desirable. Indeed it will be obvious that in systems according to the invention, a change in secondary resistance can readily be coordinated ith a change in adjustment of the control rheostat, for instance, by means of master controller jointly controlling the primary and secondary motor circuits. Such a controller may operate switches such as 7a and 7b (Fig. 4) in the secondary circuit. However, when the secondary motor circuit is given a capacitive component, as illustrated in Fig. 1, the available range of speed control can be greatly increased without necessitating a change of the secondary circuit connections. The above-mentioned characteristic Q obtained with a comparatively low resistance in the secondary rotor circuit is modified by the capacitive shunt circuits through capacitors 4, 5 and 6 so as to assume the shape of the characteristic S. This modified characteristic extends the available range of speed control down to near zero speed. The broken-line extensions of the curves shown in Fig. 7 exemplify the modified speed-torque characteristics obtainable by means of parallel capacitors 4, 5 and 6 in the secondary motor circuit. The provision of such capacitors has also the advantages of a better power factor and a higher efficiency at low speeds.

In order to secure the above-explained increase in range of speed control, the shunt capacitors in the secondary motor circuit must be given a sufficiently high capacitance rating. The most favorable rating depends upon the impedance and circuit conditions of the particular application. Generally, for a secondary circuit as shown, the capacitance of each capacitor for 3-phase motors of 1 H. P. and more will be in the order of several microfarads up to several hundred microfarads. For instance, capacitors of 377 microfarads each, in combination with secondary resistors of 2.35 ohms each, were found to offer optimum results with a standard 5 H. P. four-pole motor for 220 volt 3-phase primary voltage, 60 C. P. S.

The anti-hunt windings 17, 27, 37 (Fig. 1) are excited together with the control windings 12, 22, 32 from the rectifier 51 and hence respond also to the motor terminal voltage. The circuit of the anti-hunt windings includes a series resistor rated in accordance with the desired time constant of the anti-hunt action (a damping effect) and the windings 17, 27, 37 are poled to oppose the control windings 12, 22, 32, respectively, but their ampere turns under steady state conditions, are smaller than those of the control windings 12, 22, 32. Hence the control is mainly effected by windings 12, 22, 32, as described above, while the anti-hunt windings have only a modifying effect and delay the resultant flux build up or change due to changes in motor terminal voltage thus preventing oscillatory effects and damping the effects of transients. It will be understood that the anti-hunt circuit is not always required. On the other hand, such anti-hunt windings may also be used in the other embodiments of the invention described hereinafter although, for simplicity, such auxiliary windings are not shown in the other figures.

For the sake of completeness, it may also be mentioned that it may be desirable or necessary, depending upon the reactor core material and other conditions, to provide the saturable reactors in Fig. 1 or in any of the other embodiments with an additional direct-current bias winding or to incorporate into one of the direct-current winding circuits a source of constant bias, not essential to the present invention, and therefore not further referred to in this specification.

Instead of deriving the variable reactor control voltage directly from the reactor-controlled terminal voltage of the induction motor, it is, of course, also possible to use as a variable control stimulus any other voltage or current magnitude of the primary or secondary motor circuit whose value has a sufficiently definite relation to changes in speed. One of these other magnitudes available as a control stimulus is the voltage drop across the series impedance devices. This voltage drop changes in a definite though inverse relation to the motor terminal voltage, and consequently can be applied as a control voltage provided proper polarity reversing means or a suitable poling of the control circuit is used. This will be understood from the embodiment shown in Fig. 2.

Figure 2:
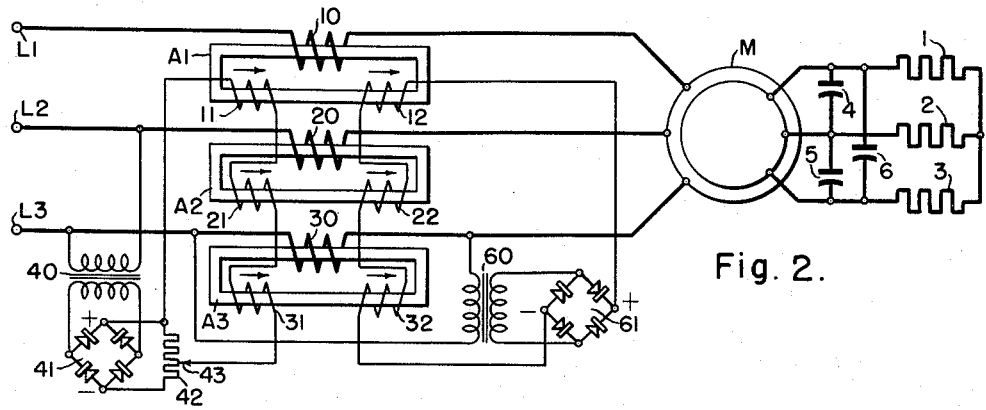

The control system according to Fig. 2 gives control by series reactors in substantially the same manner as in the system of Fig. 1, except that the variable component control voltage for presaturating the reactors is taken from the secondary winding of a transformer 60 whose primary is connected across the main winding 30 of the reactor A3. The voltage from transformer 60 is rectified by a rectifier 61 and applied to the reactor control windings 12, 22 and 32. This variable control voltage drops with increasing motor terminal voltage. Consequently, its magnetizing effect on the series reactors must be reversed relative to the voltage-responsive magnetizing effect in the system of Fig. 1. Accordingly, the windings 12, 22 and 32 in the system of Fig. 2 are so poled with respect to the fixed bias windings 11, 21 and 31 that the resultant degree of reactor saturation depends upon the algebraic sum of the voltage adjusted at rheostat 42 and the voltage supplied by the rectifier 61. By properly adjusting the amounts and ratio of these two voltages, the system of Fig. 2 can be given substantially the same performance as explained above with reference to Fig. 1.

Systems according to the invention and based on the principles explained in the foregoing may also be equipped with an amplifier between the control winding or windings of the series impedance and one or several of the sources that supply the control voltages. According to the preferred embodiments of the invention involving the provision of saturable reactance devices in the current supply circuit of the motor, it is preferable to use amplifying means of the electromagnetic type, as will be elucidated by the embodiments shown in Figs. 3 and 4.

According to Fig. 3 the series reactors A1, A2 and A3 have direct current control windings 11, 21 and 31 connected by a circuit including blocking rectifier R1 to the output circuit of an electrodynamic amplifier B, consisting essentially of an amplifying generator which operates along the substantially linear and unsaturated portion of its magnetic characteristics. Rectifier R1 prevents a reversal of current in the windings 11, 21 and 31 in case the resultant of the control signals reverses. The voltage generated in the armature 81 of this machine and applied to the reactor control windings is controlled by four generator field windings 82, 83, 84 and 85. Winding 82 is a self-excited series winding and provides most of the field excitation needed to obtain the desired output voltage. Winding 83 is a self-excited shunt winding which may be poled to oppose the field winding 82 in order to minimize hunting. The self excitation jointly provided by windings 82 and 83 is tuned, that is, the load circuit resistance is adjusted so that the resistance line coincides with the linear portion of the magnetic characteristics of the machines, so that the remaining field windings 84 and 85 are called upon only to provide a slight control stimulus needed to shift the generator output voltage up or down along its characteristic. Winding 84 is excited by voltage proportional to the motor terminal voltage which is obtained from a transformer 50 through a rectifier 51, while winding 85 receives adjusted constant voltage from a control rheostat 42 which is energized from a transformer 40 through a rectifier 41. Windings 84 and 85 are mutually differential. Consequently, the output voltage of the amplifying generator is proportional to the difference between the constant reference voltage and the variable control voltage.

In the embodiment of Fig. 4 the control windings 14, 24 and 34 for three series reactors A1, A2, A3 are energized by an amplifier B of the magnetostatic type comprising a saturable reactor A and a rectifier 91 in series connection with the alternating-current winding 90 of the reactor. The output voltage of rectifier 91 impressed on the control windings 14, 24, 34 depends upon the reactance of winding 90 which in turn is controlled by the direct-current magnetization of reactor A caused by two control windings 92 and 93 and a fixed bias winding 94. Control winding 92 is energized in dependence of the motor primary current by means of a current transformer 95 having its output connected to the input of a full-wave rectifier 96, the output of which, in turn, is connected to winding 92. The winding 93 is energized in proportion to the motor terminal voltage by a rectifier 51 from a transformer 50. Winding 94 is excited with a substantially constant direct current and is poled in cumulative relation with winding 92. One way of obtaining this direct-current excitation is by means of rectifier 97 connected across lines L2 and L3. Winding 94 is connected across rectifier 97 in series with a calibrating resistor 98. This controls the degree of fixed saturation of reactor A. Windings 92 and 93 oppose each other so that the reactance of winding 90 and the excitation supplied from rectifier 91 to the reactor control windings 14, 24, 34 tends to vary in the sense needed to regulate for constant motor terminal voltage. The effect of the control on reactors A1, A2 and A3 is cumulative. As the primary current increases the drop across the reactors A1, A2 and A3 increases reducing the motor terminal voltage. The excitation of winding 92 is increased by the increasing load current while at the same time the excitation of winding 93 decreases. Thus the saturating flux of winding 92 increases while at the same time the opposition flux of winding 93 decreases. The change in impedance of the main reactors is in a direction to minimize changes in terminal voltage.

In systems according to the invention it may be desirable to impose on the main reactor a constant direct-current bias in order to adjust the reactance to a desired value along the magnetic reactor characteristic. This bias can be supplied to the circuit or circuits of the reactor control windings or a separate bias winding can be had. Such bias windings are shown in Fig. 4 at 17, 27 and 37 as being connected in series with a calibrating resistor 99 across rectifier 97 to have an essentially constant voltage applied thereto. Speed adjustment is achieved in this case as in Fig. 2, for example, by connecting a potentiometer 42, across rectifier 97 and connecting control windings 11, 21 and 31 in series across a tapped portion thereof.

The various embodiments and modifications described in the foregoing and shown on the drawings suffice to illustrate that the invention permits of many alternations and a number of different circuit designs, including others not specifically mentioned in this specification. It will also be realized that systems according to the invention are normally equipped with customary control relays, contacts, protective operators and the like accessories which are not illustrated because they do not form essential features of the invention proper. For various applications, it is not necessary for the series impedances to be effective during all operations of the motor. For instance, when operating a printing press the control afforded by series impedance systems according to the invention may be needed only during slow speed threading operations.

I claim as my invention:

1. A motor control system, comprising an induction motor having a primary winding circuit and a secondary winding circuit, an alternating-current supply circuit connected with said primary winding circuit, variable impedance means series connected in said primary winding circuit and having direct-current control means, an amplifying generator having an armature circuit connected with said control means to apply variable voltage thereto and having control field means for controlling said variable voltage, and circuit means connected with said control field means for exciting the latter and including condition-responsive voltage supply means connected with said primary winding circuit and responsive to an operating condition of said motor depending upon the impedance of said impedance means.

2. A motor control system, comprising an induction motor having a primary winding and a secondary winding, an alternating-current supply circuit connected with said primary winding, variable impedance means series connected in said supply circuit and having direct-current control means, a saturable reactor having an alternating-current winding and direct-current winding means, a rectifier series connected with said alternating-current winding and having an output circuit connected with said control means, a source of adjustable voltage connected with said winding means, condition-responsive circuit means connected to said supply circuit and responsive to a voltage condition of said supply circuit dependent upon the impedance of said impedance means, said circuit means being also connected with said winding means for controlling said reactor jointly with said source, and impedance means including capacitors connected across said secondary winding.

3. A motor control system, comprising an induction motor having a primary current supply circuit and a secondary resistance circuit, variable impedance means series connected in said primary circuit and having impedance control means, a source of normally constant direct-current voltage, a source of variable voltage connected with said primary circuit and responsive to a voltage condition of said circuit dependent upon the impedance of said impedance means, said two sources being connected with said impedance control means for jointly controlling the impedance of said impedance means, and capacitance means connected across said secondary circuit.

4. A motor control system, comprising a wound-rotor motor having a primary current supply circuit and an external secondary circuit, resistance means in said secondary circuit, variable impedance means series connected in said primary circuit and having impedance control means, a source of normally constant direct-current voltage, a source of variable voltage connected with said primary circuit and responsive to a voltage condition of said circuit dependent upon the impedance of said variable impedance means, said two sources being connected with said impedance control means for jointly controlling the impedance of the variable impedance means, and capacitor means connected across said secondary circuit between said resistance means and said motor.

5. In a control for an induction motor having a primary winding and a secondary winding, the combination of variable impedance means for controlling the energization of said motor, current responsive means responsive to the current supplied to said motor, voltage responsive means responsive to the terminal voltage of said motor, control means connected with both said current responsive means and said voltage responsive means to be energized thereby for controlling said variable impedance means, resistance means connected to said secondary winding to form a closed circuit therewith, and capacitor means connected across said circuit.

6. In a control for an iduction motor having a primary winding and a secondary winding, the combination of variable impedance means for controlling the energization of said motor, current responsive means responsive to the current supplied to said motor, voltage responsive means responsive to the terminal voltage of said motor, circuit control means differentially connecting said current responsive means and said voltage responsive means to be energized thereby for controlling said variable impedance means, resistance means connected to said secondary winding to form a closed circuit therewith, and capacitor means connected across said circuit.

7. In a control for an induction motor having a primary winding and a secondary winding, the combination of saturable reactor means connected in series with said motor to control energization thereof, control winding means associated with said saturable reactor for controlling the reactance thereof, current responsive means connected with said motor to respond to the energizing current supplied to the motor, voltage responsive means connected to the motor to be energized in dependence of the terminal voltage of said motor, circuit means connecting said current responsive means and said voltage responsive means to said control winding means to energize said control winding means, resistance means connected to said secondary winding to form a closed circuit therewith, and capacitor means connected across said circuit.

8. In a control for an induction motor having a primary winding and a secondary winding, the combination of, saturable reactor means connected in series with said motor to control energization thereof, control winding means associated with said saturable reactor for controlling the reactance thereof, current responsive means connected with said motor to respond to the energizing current supplied to the motor, voltage responsive means connected to the motor to be energized in dependence of the terminal voltage of said motor, electrical means differentially electrically connecting said current responsive means and said voltage responsive means, circuit connections between said electrical means and said control winding means for energizing said control winding means, resistance means connected to said secondary winding to form a closed circuit therewith, and capacitor means connected across said closed circuit.

9. In a control for an induction motor having a primary winding and a secondary winding, the combination of, saturable reactor means connected in series with said motor to control energization thereof, control winding means associated with said saturable reactor for controlling the reactance thereof, current responsive means connected with said motor to respond to the energizing current supplied to the motor, voltage responsive means connected to the motor to be energized in dependence of the terminal voltage of said motor, a second saturable reactor having a main winding adapted for excitation with alternating current and having a pair of differentially related saturation control windings, circuit means connecting one of said pair of saturation control windings to said current responsive means to be energized thereby, circuit means connecting the other of said pair of saturation control windings to said voltage responsive means to be energized thereby, rectifier means connecting said main winding to said control winding means to energize said control winding means, resistance means connected to said secondary winding to form a closed circuit therewith, and capacitor means connected across said closed ciruit.

10. In a control for an induction motor having a primary winding and a secondary winding, the combination of, saturable reactor means connected in series with said motor to control energization thereof, control winding means associated with said saturable reactor for controlling the reactance thereof, current responsive means connected with said motor to respond to the energizing current supplied to the motor, voltage responsive means connected to the motor to be energized in dependence of the terminal voltage of said motor, a second saturable reactor having a main winding adapted for excitation with alternating current and having a pair of differentially related saturation control windings, circuit means connecting one of said pair of saturation control windings to said current responsive means to be energized thereby, circuit means connecting the other of said pair of saturation control windings to said voltage responsive means to be energized thereby, rectifier means connecting said main winding to said control winding means to energize said control winding means, resistance means connected to said secondary winding to form a closed circuit therewith, capacitor means connected across said closed circuit, and control winding means on said saturable reactor means for applying an adjustable constant degree of saturation bias to said saturable reactor means.

11. A motor control system comprising, an induction motor having primary windings and secondary windings, an alternating-current supply circuit connected with said primary windings, variable impedance means series connected in said supply circuit and having control means, amplifying means having an output circuit connected with said control means and having a pair of input circuits respectively connected to said supply circuit on opposite sides of said impedance means, and impedance means including capacitors connected across said secondary windings.

References Cited in the file of this patent

UNITED STATES PATENTS

| | | |
|---|---|---|
| 2,433,153 | Pell et al. | Dec. 23, 1947 |
| 2,455,869 | Krabbe | Dec. 7, 1948 |
| 2,519,196 | Pell | Aug. 15, 1950 |
| 2,589,277 | Noodleman | Mar. 18, 1952 |
| 2,683,846 | Carnegie et al. | July 13, 1954 |